(12) United States Patent
Ishitani et al.

(10) Patent No.: US 8,436,965 B2
(45) Date of Patent: May 7, 2013

(54) SEMICONDUCTOR DEVICE

(75) Inventors: Tetsuji Ishitani, Kanagawa (JP);
Daisuke Kubota, Kanagawa (JP);
Takeshi Nishi, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 0 days.

(21) Appl. No.: 13/479,537

(22) Filed: May 24, 2012

(65) Prior Publication Data

US 2012/0228661 A1   Sep. 13, 2012

Related U.S. Application Data

(63) Continuation of application No. 11/802,123, filed on May 21, 2007, now Pat. No. 8,189,141.

(30) Foreign Application Priority Data

Jun. 2, 2006   (JP) .................................. 2006-154801

(51) Int. Cl.
*G02F 1/1335*    (2006.01)
*G02F 1/1343*    (2006.01)

(52) U.S. Cl.
USPC .......................................... 349/108; 349/141

(58) Field of Classification Search ................... 349/108, 349/141
See application file for complete search history.

(56) References Cited

U.S. PATENT DOCUMENTS

| | | | |
|---|---|---|---|
| 6,346,932 B1 | 2/2002 | Maeda | |
| 6,473,067 B2 | 10/2002 | Maeda | |
| 6,657,608 B2 | 12/2003 | Maeda | |
| RE40,770 E | 6/2009 | Maeda | |
| 7,889,295 B2 | 2/2011 | Kimura et al. | |
| 2004/0227698 A1 | 11/2004 | Yamazaki et al. | |
| 2005/0179840 A1 | 8/2005 | Park et al. | |
| 2005/0237465 A1* | 10/2005 | Lu et al. ....................... | 349/141 |
| 2007/0085476 A1 | 4/2007 | Hirakata et al. | |

FOREIGN PATENT DOCUMENTS

| | | |
|---|---|---|
| JP | 05-264989 | 10/1993 |
| JP | 05-313158 | 11/1993 |
| JP | 06-222356 | 8/1994 |
| JP | 07-056161 | 3/1995 |
| JP | 07-248490 | 9/1995 |
| JP | 08-234018 | 9/1996 |
| JP | 08-292425 | 11/1996 |
| JP | 11-052117 | 2/1999 |
| JP | 11-119208 | 4/1999 |
| JP | 2002-277608 | 9/2002 |
| JP | 2003-255320 | 9/2003 |
| JP | 2004-004754 | 1/2004 |
| JP | 2004-098420 | 4/2004 |
| JP | 2005-038608 | 2/2005 |

* cited by examiner

*Primary Examiner* — Jerry Rahll
(74) *Attorney, Agent, or Firm* — Nixon Peabody LLP; Jeffrey L. Costellia

(57) ABSTRACT

External light is reflected due to a difference in refractive indices of a black matrix and a glass substrate. When the black matrix is a black resin, there is a difference in refractive indices of the black resin and a first substrate. Also, there is a difference in refractive indices of the colored layer and the first substrate. Therefore, external light is slightly reflected. There is a problem in that the reflected light reduces contrast. A structure in which one polarizing element having dichroism is interposed between a pair of substrates is employed, and a light interference layer is provided between a color filter and a glass substrate, whereby a difference in refractive indices is moderated to reduce light reflection.

31 Claims, 6 Drawing Sheets

SEMICONDUCTOR DEVICE

BACKGROUND OF THE INVENTION

1. Field of the Invention

The present invention relates to a semiconductor device that has a circuit including a thin film transistor (hereinafter, referred to as a TFT) and a manufacturing method thereof. For example, the present invention relates to an electronic device on which an electro-optical device typified by a liquid crystal display panel is mounted as a component.

It is to be noted that the term "semiconductor device" in the present specification indicates a general device capable of functioning by utilization of semiconductor characteristics, and electro-optic devices, semiconductor circuits, and electronic devices are all included in the semiconductor device.

2. Description of the Related Art

In recent years, a technique has attracted attention, in which a thin film transistor (TFT) is formed using a semiconductor thin film (a thickness of about several nm to several hundred nm) that is formed over a substrate having an insulating surface. Such a thin film transistor is widely applied to electronic devices such as ICs or electro-optical devices, and development thereof as a switching element of an image display device is particularly urgent.

A liquid crystal display device is known as an image display device. Active matrix-type liquid crystal display devices have been commonly used because a high-definition image can be obtained by the case of using the active matrix-type device as compared with the case of using a passive-type liquid crystal display device. In the active matrix-type liquid crystal display device, when pixel electrodes arranged in matrix are driven, a display pattern is formed on a screen. As for details, when a voltage is applied between a selected pixel electrode and an opposite electrode that corresponds to the selected pixel electrode, optical modulation of a liquid crystal layer arranged between the pixel electrode and the opposite electrode is performed, and this optical modulation is recognized as a display pattern by observers.

In a general transmission-type liquid crystal display device, a liquid crystal layer is arranged between a pair of substrates (a first substrate and a second substrate), a first polarizing element is arranged on an outer surface side, which is not adjacent to the liquid crystal layer, of the first substrate (substrate provided with a pixel electrode), and a second polarizing element is arranged on an outer surface side, which is not adjacent to the liquid crystal layer, of the second substrate (opposite substrate).

When a color filter is used for displaying full color, the color filter is generally arranged on a difference surface from the surface of the substrate (opposite substrate) where the polarizing element is arranged. In other words, the color filter is generally arranged between the opposite substrate and the liquid crystal layer.

A technique for forming a color filter successively with the use of rollers is disclosed in Reference 1 (Japanese Published Patent Application No. H8-234018). Moreover, in Reference 1, at least two or more films are attached to a front surface or a rear surface of a film is disclosed, the at least two or more films being selected from an optical thin film having a color filter function, an optical thin film having a fluorescent function, an optical thin film having an antireflection function, an optical thin film having a phase compensation function, an optical thin film having a light shielding function, a transparent thin film having conductivity, or a transparent thin film having an adhesive function.

In recent years, high-definition of a display image and improvement in display quality in liquid crystal display devices have been demanded. When the observer sees display of the liquid crystal display device in a vertical direction to a substrate surface of the display device, display quality in accordance with design of the liquid crystal display device can be obtained since arrangement of pixel electrodes and position of color filters (one colored layer with respect to one pixel) approximately correspond to each other. However, when the observer sees display in a diagonal direction to the substrate surface, apparent misalignment occurs due to parallax. In addition, since light leakage is caused due to this parallax, contrast of display is lowered. Accordingly, a viewing angle characteristic is caused, in which display quality is degraded when the observer sees display in a diagonal direction to the substrate surface. In particular, if a pixel size is miniaturized as compared with a thickness of the substrate in order to achieve high-definition of the display image, the parallax becomes remarkable, and a viewing angle for ensuring an allowable display characteristic is narrowly limited.

Further, easiness for seeing display of the liquid crystal display device depends on brightness of surrounding light. In a case of using a mobile-type liquid crystal display device or an outdoor-type liquid crystal display device, surrounding light is changed from brightness of sunlight in daytime to brightness in nighttime. Thus, such a liquid crystal display device is formed as a transmission-type or a semitransmission-type liquid crystal display device having a backlight to uniform easiness for seeing display, and then the convenience becomes favorable. However, when an intense light source is used as a backlight to uniform easiness for seeing the liquid display device under external light in daytime, light leakage due to parallax becomes increased; therefore, it is difficult to hold contrast of display.

SUMMARY OF THE INVENTION

It is an object of the present invention to provide a liquid crystal display device that can achieve a wide viewing angle and high image display with high contrast. In particular, it is an object of the present invention to provide a liquid crystal display device that can achieve high display quality under external light.

In order to solve the foregoing object, among two polarizing elements, a first polarizing element having dichroism is arranged between a pair of substrates (a first substrate and a second substrate), and at that time, the first polarizing element having dichroism is arranged to be brought close to a color filter as much as possible. A light interference layer is arranged between the color filter and the first substrate. A transistor and a pixel electrode connected to the transistor are formed over the second substrate. Moreover, the pixel electrode is arranged to be bought close to the color filter as much as possible to ensure a wide viewing angle.

A second polarizing element having dichroism is attached to the second substrate to be in a cross-nicol state with respect to the first polarizing element having dichroism. The second substrate and a liquid crystal layer are interposed between the first polarizing element having dichroism and the second polarizing element having dichroism; however, the color filter is not interposed therebetween. This is because the color filter contains a pigment particle that becomes a cause of scattering light, and accordingly, if the color filter is arranged between a pair of the polarizing elements having dichroism, contrast is lowered due to depolarization. Further, a fluorescent layer is not arranged between the pair of the polarizing elements having dichroism for the same reason. If the color filter and the liquid crystal layer are adjacent to each other, there is a risk that air bubbles are generated from the color filter or that the liquid crystal layer is contaminated with an impurity from the color filter.

As the polarizing element having dichroism, one in which a PVA (polyvinyl alcohol) film in which absorption and orientation of dichroic pigment is conducted is interposed between two protective films is used. As the protective film, TAC (triacertylcellulose) or the like can be used, and as the dichroic pigment, iodine and dichroic organic dye are used. In addition, a polarizing element having dichroism in which disciform water-soluble lyotropic liquid crystal pigment is used and an inorganic polarizing element using aluminum or the like can be used.

The color filter is provided to be close to the first polarizing element having dichroism, and a distance between the color filter and the pixel electrode are closed as much as possible. Thus, an optical sheet, for example, a light scattering layer or a fluorescent layer is not provided between the color filter and the first polarizing element having dichroism.

It is to be noted that the fluorescent layer is luminous by external light as well as a backlight, and reduction in contrast is caused under external light; therefore, the fluorescent layer is not used. In order to improve contrast even under external light, a light interference layer is provided between the color filter and the first substrate in the present invention. The color filter comprises a black matrix and a colored layer; however, external light is reflected by a difference in refractive indices between the black matrix and the first substrate. The light interference layer is particularly effective in a case of using a chromium film as the black matrix. Even when the black matrix comprises a black resin, there is a difference in refractive indices between the black matrix and the first substrate. Also, there is also a difference in refractive indices between the colored layer and the first substrate. Therefore, external light is slightly reflected. For example, a refractive index of a glass substrate is approximately 1.5. While, a refractive index of the colored layer in a case of averaging each layer is approximately 1.6; however, there is a refractive index of approximately 1.8 depending on materials. Furthermore, when the light interference layer is provided between the color filter and the first substrate, a difference in the refractive indices is moderated, and light reflection can be further reduced.

The light interference layer may have a single layer or a multilayer as long as light reflection due to the black matrix or the colored layer can be prevented, and specifically, a layer that is referred to as an antireflection (preventing reflection) film is used. In addition, as the light interference layer, a dielectric multilayer film can be used. The dielectric multilayer film has a structure in which a low refractive index thin film and a high refractive index thin film are stacked.

An aspect of an invention disclosed in the present specification is a semiconductor device including a first substrate over an insulating surface of which a light interference layer, a plurality of colored layers, and a first polarizing element having dichroism are sequentially stacked; a second substrate over one surface of which a pixel electrode and a thin film transistor are formed; a liquid crystal layer between the first substrate and the second substrate; and a second polarizing element having dichroism over the other surface of the second substrate.

In a structure of the above semiconductor device, a first alignment film is provided between the pixel electrode and the liquid crystal layer. In addition, in the above semiconductor device, a second alignment film is provided between the first polarizing element having dichroism and the liquid crystal layer. Further, in the above semiconductor device, an opposite electrode is provided between the first polarizing element having dichroism and the liquid crystal layer.

In a case of an IPS (In Plane Switching) type liquid crystal display device, another aspect of the invention disclosed in the present specification is a semiconductor device including a first substrate over an insulating surface of which a light interference layer, a plurality of colored layers, and a first polarizing element having dichroism are sequentially stacked; a second substrate over one surface of which a pixel electrode, a common electrode, and a thin film transistor are formed; a liquid crystal layer between the first substrate and the second substrate; and a second polarizing element having dichroism over the other surface of the second substrate.

In each structure of the above semiconductor device, an adhesive layer having a light transmitting property is provided between the first polarizing element having dichroism and the colored layer for fixing them.

In addition, in each structure of the above semiconductor device, among the plurality of the colored layers, a light shielding layer is provided between the different colored layers. This light shielding layer has a difference in a refractive index from the first substrate, and the difference in refractive indices is moderated by the light interference layer.

When a polarizing element having dichrosim is arranged between a pair of substrates so as to achieve the above structure, device for dividing the substrates is needed in mass production. In the conventional dividing method, after the pair of the substrates is attached to each other, scribing is performed to one or both of substrate surfaces with a diamond cutter or the like, and then division is performed with pressure. However, in the conventional dividing method, it is difficult to cut the polarizing element having dichroism in addition to the pair of the substrates. Accordingly, the pair of the substrates and the polarizing element having dichroism are cut together using a dicing machine or laser light.

In addition, since the polarizing element having dichroism has low heat resistance, an opposite electrode is preferably formed under a film formation condition where the polarizing element having dichroism is not damaged. When the opposite electrode is etched, selective etching is preferably performed under an etching condition where the polarizing element having dichroism is not damaged. However, when an IPS method is employed as a driving method of liquid crystal, the opposite electrode and the pixel electrode are formed over the same substrate, and the above problem does not occur, which is preferable.

The above methods are not just designing points but a point invented after appropriate selection of arrangement position of a color filter and a polarizing element having dichroism; the manufacture of a display device using a combination thereof; display of a pixel; and a deep consideration by the inventors.

According to the present invention, a liquid crystal display device capable of having a wide viewing angle and high image display with high contrast can be achieved. In particular, high contrast can be achieved under external light.

Further, one polarizing element having dichroism and a color filter are arranged on an inner side of a pair of glass substrates, and then one of the pair of the glass substrates can have a surface that is exposed. When the glass substrate surface is exposed, a protection film for preventing scratches on the glass substrate surface, an antireflection film for preventing glare of external light, an antistatic film for preventing attachment of dust, or an antiglare (prevention of dazzle) film can be easily attached thereto. It is to be noted that another polarizing element having dichroism is attached on an outer side of the other glass substrate that is not exposed.

Furthermore, the exposed surface of the glass substrate can be thinned by polishing. Generally, it is difficult to attach an optical film to the glass substrate thinned by polishing because pressure is given when attaching. However, in the present invention, a necessary optical film or one polarizing element having dichroism is provided between a pair of substrates before polishing; therefore, attachment of an optical film to a glass substrate that is thinned by polishing is unnecessary. It is to be noted that, when the exposed surface of the one glass substrate is polished, another polarizing element having dichroism is attached on an outer side of the other glass substrate that is not polished.

Furthermore, when a plastic substrate or a hybrid substrate using a norbornene resin is used instead of the glass substrate, the thickness and weight of the whole liquid crystal display device can be further reduced.

DETAILED DESCRIPTION OF THE INVENTION

Embodiment modes of the present invention will be explained below.
(Embodiment Mode 1)

Figure 1:
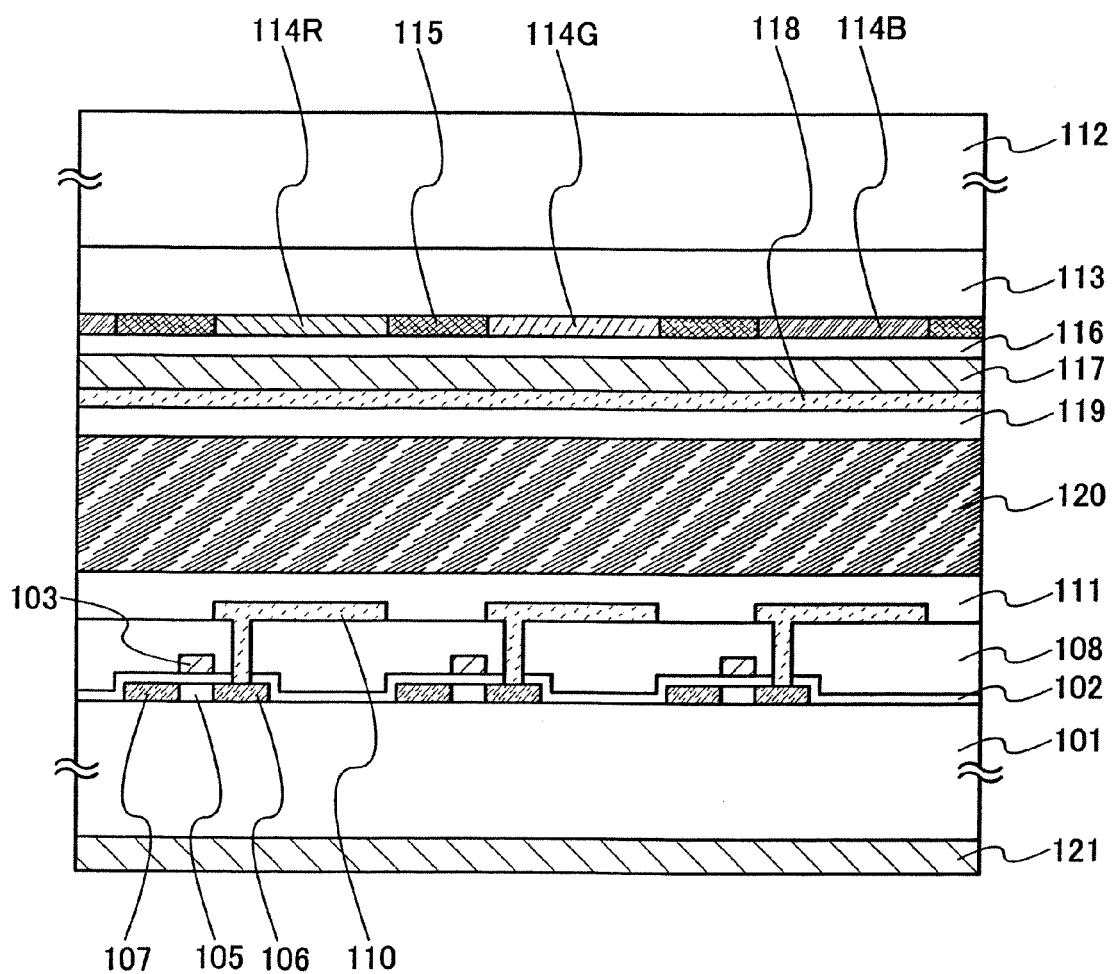
FIG. 1 is a view showing an example of a cross-sectional view of a liquid crystal panel (Embodiment Mode 1).

Here, an example of manufacturing a direct-view-type liquid crystal display device using TN (Twisted nematic) type liquid crystal with reference to FIG. 1.

First, a light interference layer 113 is formed over one surface of a first substrate 112 that is to be an opposite substrate. As the first substrate 112, a glass substrate is used.

The light interference layer 113 is provided to reduce reflection of external light at an interface that is formed from materials having different refractive indices. When the light interference layer 113 has a multilayer structure in which layers each having a different refractive index are stacked so that the interference layer 113 is widely effective to a wavelength region of visible light, external light reflected at interfaces of the stacked layers interferes and be canceled with each other; therefore, antireflection effect can be obtained. Here, the light interference layer 113 reduces reflection of external light at an interface of the first substrate and a light shielding layer that is formed later. In addition, the light interference layer 113 reduces reflection of external light at an interface of the first substrate and a colored layer that is formed later.

As a material of the light interference layer 113, a single layer selected from silicon, nitrogen, fluorine, an oxide, a nitride, or a fluoride or a stacked layer thereof can be used. Specifically, $MgF_2$, $SiO_2$, $CeF_3$, $Al_2O_3$, SiNx, ITO, $ZrO_2$, $TiO_2$, or the like can be used. As a film formation method of the light interference layer 113, a sputtering method, an electron beam evaporation method, a sol-gel method, a dip coating method, an air-knife coating method, a blade coating method, a forward roll coating method, a reverse roll coating method, a gravure coating method, a micro gravure coating method, a wire bar coating method, a direct-die technique, or the like can be used. When the light interference layer 113 serves as an antireflection film, the light interference layer in which material layers are stacked is formed to have a thickness of about 0.5 μm in total.

Next, a light shielding layer 115 serving as a black matrix is formed over the light interference layer 113. The light shielding layer 115 can be formed using a metal film such as a chromium film or a black resin, but it is preferable to use a metal film that has a high light shielding property and can be subjected to minute etching process.

Subsequently, a colored layer is formed in a place corresponding to each pixel. Here, a red colored layer 114R, a green colored layer 114G, and a blue colored layer 114B are formed. FIG. 1 shows that all thicknesses of the colored layers and a thickness of the light shielding layer are same for simplification; however, there is no particular limitation on each thickness. In addition, FIG. 1 shows that end portions of the light shielding layer and end potions of each colored layer are aligned with each other for simplification; however, the colored layers may partly overlap over the end portions of the light shielding layer. Then, an overcoat layer 116 with which the light shielding layer and the colored layers are covered is formed for planarization and protection.

When a color filter is manufactured, the following steps are desirably taken: a metal film such as a chromium film is formed as a black matrix because the metal film has a high light shielding property as compared with a black resin; and then, red, green, and blue colored layers are each formed by a printing method, an ink-jet method, an etching method using a photolithography technique, or the like. In a case of using a black resin in order to shield light, as external light is stronger, a thick thickness of the black resin is needed, and accordingly, a thickness of the whole color filter is increased. In addition, in a case of using the black resin as a black matrix, materials of the black resin are limited because the colored layer is also a resin material so that the material of the black resin and the material of the colored layer are not mixed in formation.

Next, a first polarizing element 117 having dichroism is attached to the overcoat layer 116. Although not shown here, an adhesive layer for attachment is provided between the overcoat layer 116 and the first polarizing element 117 having dichroism. If necessary, the first polarizing element 117 having dichroism may be provided with a retardation film.

Subsequently, an opposite electrode 118 comprising a transparent conductive film is formed over the first polarizing element 117 having dichroism. In a case of providing a retardation film, the retardation film is arranged between the opposite electrode 118 and the first polarizing element 117 having dichroism.

Then, an alignment film 119 is formed over the opposite electrode 118. Thereafter, rubbing treatment for alignment of liquid crystal molecules is performed to the alignment film 119.

In the steps up to here, preparation of the opposite substrate side, that is, the first substrate (before attachment to a second substrate) side is completed.

A thin film transistor (TFT) that is to be a switching element is formed over a second substrate 101. For the second substrate 101, a glass substrate is used. After a semiconductor layer, here a polysilcon film, is formed using a known technique, a first insulating layer 102 is formed.

As the semiconductor layer, an amorphous semiconductor film, a semiconductor film including a crystalline structure, a compound semiconductor film including an amorphous structure, or the like can be used as appropriate. A semiamorphous semiconductor film (also referred to as a microcrystal semiconductor film) can also be used as an active layer of a TFT, which has an intermediate structure of the amorphous and crystalline structures (including single crystal and polycrystal) and a third state that is stable in terms of free energy, and includes a crystalline region having short-range order and lattice distortion. There is no limitation on materials of the semiconductor layer, but the semiconductor layer is preferably formed using silicon, a silicon germanium (SiGe) alloy, or the like. Alternatively, an organic compound such as pentacene can be used as the semiconductor layer.

In a case of using a semiconductor film including a crystalline structure as the semiconductor layer, not only a switching element of a pixel portion but also a driver circuit can be formed using the thin film transistor, and the pixel portion and the driver circuit can be formed over the same substrate. When the pixel portion and the driver circuit are formed over the same substrate, a thickness of a driving IC is unnecessary, the whole liquid crystal display device can be thinned, and an attaching step of the driver IC can be omitted, which is preferable.

Next, a gate electrode 103 is formed over the semiconductor layer with the first insulating layer 102 interposed therebetween. Then, doping process of an impurity element imparting n-type or p-type conductivity is performed to the semiconductor layer using the gate electrode as a mask, and a pair of impurity regions 106 and 107 each of which serves as a source region or a drain region are formed. In the semiconductor layer, a channel formation region 105 is formed between the pair of the impurity regions.

Subsequently, a second insulating layer 108 with which the gate electrode layer 103 is covered is formed. Then, the second insulating layer and the first insulating layer are selectively etched using a mask to form a contact hole reaching the impurity region 106. Thereafter, a pixel electrode 110 comprising a transparent conductive film is formed, which is electrically connected to the impurity region 106 through the contact hole. Then, although not shown here, a columnar spacer for keeping a distance between the pair of the substrates is formed.

Then, an alignment film 111 with which the pixel electrode 110 and the columnar spacer are covered is formed. The alignment film 111 is formed by a printing method or an ink-jet method. Subsequently, rubbing treatment for alignment of liquid crystal molecules is performed to the alignment film 111. It is to be noted that the rubbing direction to the alignment film 111 and the rubbing direction to the alignment film 119 are perpendicular to each other.

In the steps up to here, preparation of an element substrate side, that is, the second substrate (before attachment to the first substrate) side is completed.

Next, a sealant is drawn surrounding the pixel portion with a dispenser device in a state where the alignment film 119 provided over the first substrate 112 that is an opposite substrate is faced upward. Subsequently, a TN-type liquid crystal material is dropped in a region surrounded by the sealant, and pressure in a treatment chamber in which the first substrate 112 is arranged is reduced. Then, the first substrate is aligned with the second substrate in a state where the alignment film 111 provided over the second substrate 101 that is the element substrate is faced downward, and the first and second substrates are attached under the reduced pressure. After the attachment is completed, the reduced pressure state is changed to be an atmospheric pressure state. Thus, a liquid crystal layer 120 is sealed between the pair of the substrates. Here, an example is shown, in which the pair of the substrates are attached to each other under reduced pressure; however, it is not particularly limited, and a known technique may be used.

Then, the substrates are divided if necessary. In this embodiment mode, the first polarizing element having dichroism is arranged between the pair of the substrates; therefore, division is performed using a dicing machine or laser light.

Finally, a second polarizing element 121 having dichroism is attached to the second substrate 101. The second polarizing element 121 having dichoroism and the first polarizing element 117 having dichroism are aligned so that each absorption axis direction is in a cross-nicol state. In the TN-type liquid crystal display device, liquid crystal is arranged in a twisted state at 90-degree between the pair of substrates, and the absorption axis direction of the polarizing element having dichroism is arranged in approximately parallel or perpendicular to the rubbing direction. In such a TN-type liquid crystal display device, when no voltage is applied to the pixel electrode, incident light from a light source such as a backlight becomes linear polarization in a polarizing element having dichroism on the light source side, and this linear polarization is transmitted along the twist of the liquid crystal layer. In addition, when the transmission axis of the other polarizing element having dichroism is aligned with an azimuth of the linear polarization, the linear polarization is all emitted to display white (normally white display). In this embodiment mode, the linear polarization passes through the color filter; therefore, color display is obtained when no voltage is applied to the pixel electrode. Alternatively, when a voltage is applied to the pixel electrode, incident light from a light source becomes linear polarization in the polarizing element having dichroism on the light source side, and the direction of an unit vector showing an average orientation direction of a liquid crystal molecule axis included in the liquid crystal layer is the approximately perpendicular to the substrate surface. Therefore, the linear polarization is transmitted without changing of an azimuth thereof on the light source side, and the azimuth is aligned with the absorption axis of the other polarizing element having dichroism, and black display is obtained.

In addition, if necessary, a retardation film may be arranged between the second substrate 101 and the second polarizing element 121 having dichroism.

In a liquid crystal display device having the thus obtained liquid crystal panel, a distance between the first polarizing element having dichroism and the second polarizing element having dichroism is narrow, and a wide viewing angle can be secured. In addition, the color filter is provided between the first polarizing element having dichroism and the first substrate, whereby reduction in contrast due to depolarization is prevented. Further, the light interference layer is provided between the color filter and the first substrate in order to prevent reflection of external light by moderation of a difference in refractive indices of the first substrate and the color filter, whereby high contrast is achieved even under external light.

The present invention can be applied to any thin film transistor as long as the thin film transistor can serve as a switching element regardless of a structure of the switching element. FIG. 1 shows an example in which a top gate-type thin film transistor is provided over the substrate having an insulating property; however, a bottom gate-type (inversely staggered-type) TFT or a forward staggered-type TFT can be used.

Moreover, it is not limited to the TFT having a single gate structure, and a multigate-type TFT having a plurality of channel formation regions, for example, a double gate-type TFT can be employed.

In this embodiment mode, an example in which full-color display is performed with the use of three colors of red, green, and blue; however, the color display is not particularly limited thereto. A color of cyan, magenta, or yellow may be used.

In this embodiment mode, an example of the TN-type liquid crystal display device is shown; however, it is not particularly limited, and the present invention can be applied to various modes of liquid crystal display devices. For example, as a method for improving a viewing angle characteristic, the present invention can be applied to a lateral electric field method (also referred to as IPS) in which an electric field in the horizontal direction to the main surface of the substrate is applied to the liquid crystal layer. In addition, the present invention can be applied to a method in which a vertical alignment film is used as an alignment film with the use of a nematic liquid crystal material having negative dielectric anisotropy as a liquid crystal material. This method in which the vertical alignment film is used is one of voltage control birefringence (also referred to as ECB) methods, and transmittance is controlled utilizing birefringence of the liquid crystal molecules.

As a method for improving response speed, response speed of the liquid crystal layer may be improved so as to response a moving image with the use of ferroelectric liquid crystal and antiferroelectric liquid crystal.

Further, the present invention can be applied to a transmission-type liquid crystal display device in which an OCB (Optical Compensate Birefringence) mode is employed. The OCB mode improves response speed of a liquid crystal layer by the liquid crystal layer between a pair of substrates being made to be in a state referred to as bend alignment. A pretilt angle of the first alignment film in contact with the liquid crystal layer and a pretilt angle of the second alignment film in contact with the liquid crystal layer are reversed, whereby the bend alignment is made. In this OCB mode, the liquid crystal layer is needed to be transferred from splay alignment that is an initial state to the bend alignment state.

Furthermore, the present invention can be applied to a transmission-type liquid crystal display device in which a vertical alignment mode is employed. In the transmission-type liquid crystal display device in which the vertical alignment mode is employed, one pixel is set to be a plurality of sub-pixels, and a convex part is provided in an opposite substrate positioned in a center part of each of sub-pixels, whereby orientation division (multi-domain) of one pixel is performed; accordingly, a driving method for achieving a wide viewing angle is employed. This driving method is referred to as sub-pixel driving.

(Embodiment Mode 2)

Figure 2:
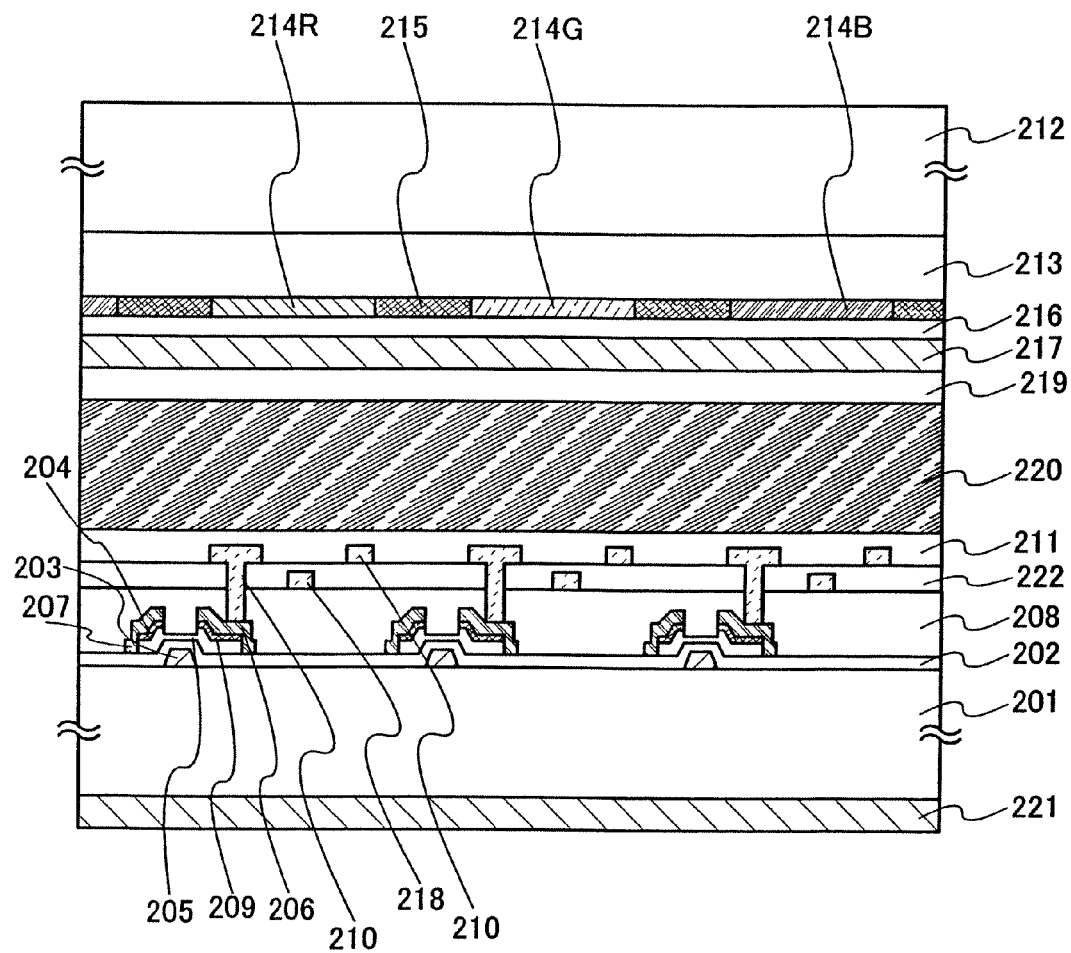
FIG. 2 is a view showing an example of a cross-sectional view of a liquid crystal panel (Embodiment Mode 2).

Although an example of the TN-type liquid crystal display device is shown in Embodiment Mode 1, in this embodiment mode, an example of an IPS (In Plane Switching) type liquid crystal display device is shown in FIG. 2. This IPS-type liquid crystal display device has a method in which a pixel electrode and a common electrode are formed over one of a pair of substrates that sandwich liquid crystal, and liquid crystal molecules are rotated in a plane between these electrodes, which is approximately parallel to a substrate surface, whereby switching of light is performed, and then display is performed. Since the liquid crystal molecules are rotated in an approximate parallel plane, inversions of gradation and hue are not generated due to a viewing angle, and accordingly, a wide viewing angle can be obtained as compared with the TN-type liquid crystal display device. In the IPS-type liquid crystal display device, arrangement of polarizing elements having dichroism is different from that of the TN-type, and the polarizing elements having dicroism are arranged to perform black display when no voltage is applied to the pixel electrode.

Although an example of the top-gate structure of the thin film transistor is shown in Embodiment mode 1, in this embodiment mode, an example of an inversely staggered structure is shown.

First, a light interference layer 213 is formed over one of surfaces of a first substrate 212 that is to be an opposite substrate.

The light interference layer 213 is provided in order to reduce reflection of external light at an interface that is formed from materials having different refractive indices. The light interference layer 213 has a multilayer structure of stacked layers having different refractive indices from each other, so that the light interference layer is widely effective to wavelength regions of visible light. Thus, external lights reflected at interfaces of the stacked layers interfere and are canceled with each other, whereby antireflection effect can be obtained. Here, the light interference layer 213 reduces reflection of external light at an interface of the first substrate and a light shielding layer formed later. In addition, the light interference layer 213 also reduces reflection of external light at an interface of the first substrate and a colored layer formed later.

Next, a light shielding layer 215 serving as a black matrix is formed over the light interference layer 213. For the light shielding layer 215, a metal film such as a chromium film or a black resin can be used, but it is preferable to use a metal film that has a high light shielding property and can be subjected to minute etching process.

Subsequently, colored layers are formed in a place corresponding to each pixel.

Here, a red colored layer 214R, a green colored layer 214G and a blue colored layer 214B are each formed. Then, an overcoat layer 216 with which the light shielding layer and the colored layers are covered is formed for planarization and protection.

Next, a first polarizing element 217 having dichroism is attached to the overcoat layer 216. Although not shown here, an adhesive layer for attachment is provided between the overcoat layer 216 and the first polarizing element 217 having dichroism. Further, the first polarizing element 217 having dichroism is provided with a retardation film if needed.

Subsequently, an alignment film 219 is formed over the first polarizing element 217 having dichroism. Then, rubbing treatment for alignment of liquid crystal molecules is performed to the alignment film 219.

In the steps up to here, preparation of the opposite substrate side, that is, the first substrate (before attachment to a second substrate) side is completed.

A thin film transistor (TFT) that is to be a switching element is formed over a second substrate 201. After a gate electrode 203 is formed with the use of the known technique, a first insulating layer 202 is formed.

Next, a semiconductor layer and an n-type semiconductor layer that includes an impurity imparting n-type conductivity to a semiconductor are stacked over the first insulating layer 202. As the semiconductor layer, an amorphous semiconductor film, a compound semiconductor film including an amorphous semiconductor structure, or the like can be used as appropriate. Here, an amorphous silicon film is used as the semiconductor layer.

Subsequently, after a mask is formed, etching is selectively performed to form an island-shaped semiconductor layer and an island-shaped n-type semiconductor layer, and then a metal film is formed. After a mask is formed, etching is selectively performed to form electrodes 206 and 207 each of which serves as a source electrode or a drain electrode. The island-shaped semiconductor layers and the island-shaped n-type semiconductor layer are etched in a self-alignment manner using the electrodes 206 and 207 as a mask to form a semiconductor layer having n-type semiconductor layers 204 and 209 and a channel formation region 205.

Subsequently, a second insulating layer 208 with which the channel formation region 205 is covered is formed. Then, a common electrode 218 is formed over the second insulating layer 208. For the common electrode 218, a metal film having conductivity or a transparent conductive film can be used. The common electrode is formed into a shape corresponding to a pixel electrode formed later so that a lateral electric filed is formed between the common electrode and the pixel electrode. Further, the common electrode may be formed to have a structure that is referred to as a FFS (Fringe Field Switching) type, which has a shape having a larger electrode area than a shape of the pixel electrode.

Next, a third insulating layer 222 with which the common electrode 218 is covered is formed. Then, the third insulating layer and the second insulating layer are selectively etched using a mask to form a first contact hole reaching the electrode 206. Further, the third insulating layer, the second insulating layer, and the first insulating layer are etched using the same mask to form a second contact hole reaching the gate electrode 203.

Subsequently, a pixel electrode 210 that is electrically connected to the electrode 206 through the first contact hole is formed over the third insulating layer 222. The pixel electrode 210 has a comb-like electrode shape or a bent electrode shape, and a metal film having conductivity or a transparent conductive film can be used for the pixel electrode.

When one of or both the pixel electrode 210 and the common electrode 218 is formed using transparent conductive films, an aperture ratio is improved, which is preferable. Although not shown here, a columnar spacer is formed for keeping a distance between the pair of the substrates.

Then, an alignment film 211 with which the pixel electrode 210 and the columnar spacer are covered is formed. The alignment film 211 is formed by a printing method or an ink-jet method. Thereafter, rubbing treatment for alignment of liquid crystal molecules is performed to the alignment film 211. The rubbing treatment is performed so that the rubbing direction to the alignment film 211 is parallel to the wiring direction of the pixel electrode or has an angle with the wiring direction of the pixel electrode in some degree. It is to be noted that the rubbing direction to the alignment film 211 and the rubbing direction to the alignment film 219 are approximately parallel to each other.

In the steps up to here, preparation of the element substrate side, that is, the second substrate (before attachment to the first substrate) side is completed.

Next, a sealant is drawn surrounding a pixel portion with a dispenser device or the like in a state where the alignment film 219 provided over the first substrate 212 that is an opposite substrate is faced upward. Subsequently, a liquid crystal material is dropped in a region surrounded by the sealant, and pressure in a treatment chamber in which the first substrate 212 is reduced. Then, the first substrate is aligned with the second substrate in a state where the alignment film 211 provided over the second substrate 201 that is the element substrate is faced downward, and the first and second substrates are attached to each other under reduced pressure. After the attachment is completed, the reduced pressure state is changed into an atmospheric pressure state. Thus, a liquid crystal layer 220 is sealed between the pair of the substrates. In this embodiment mode, alignment of the liquid crystal layer 220 is made to be homogeneous alignment that is approximately parallel to the substrate in the initial state. Here, an example in which the pair of the substrates are attached under reduced pressure is shown; however, it is not particularly limited, and the known technique may be used.

Then, if necessary, the substrates are divided. In this embodiment mode, the first polarizing element having dichroism is arranged between the pair of the substrates; therefore, division is performed using a dicing machine or laser light.

Finally, a second polarizing element 221 having dichroism is attached to the second substrate 201. The second polarizing element 221 having dichroism and the first polarizing element 217 having dichroism are aligned so that each absorption direction thereof is in a cross-nicol state.

Further, if necessary, a retardation film may be arranged between the second substrate 201 and the second polarizing element 221 having dichroism.

A display device having the thus obtained liquid crystal liquid crystal panel is an IPS type in which a distance between the first polarizing element having dichroism and the second polarizing element having dichroism is narrow and a wide viewing angle can be secured. In addition, a color filter is provided between the first polarizing element having dichroism and the second substrate, whereby reduction in contrast due to depolarization can be prevented. Furthermore, the light interference layer is provided between the color filter and the second substrate in order to prevent reflection of external light by moderation of a difference in refractive indices of the color filter and the second substrate, whereby high contrast is achieved even under external light.

The present invention can be applied to any thin film transistor as long as the thin film transistor can serve as a switching element regardless of a structure of the switching element. FIG. 2 shows an example in which an inversely staggered-type thin film transistor that is a channel etching type is provided over a substrate having an insulating property; however, an inversely staggered-type thin film transistor that is a channel stop type may be employed. Further, a forward staggered-type TFT can be used. Furthermore, it is not limited to a TFT having a single gate structure, and a multigate-type TFT having a plurality of channel formation regions, for example, a double gate-type TFT may be used.

The present invention comprising the above structures will be explained further in detail with the use of embodiments shown below.

[Embodiment 1]

Figure 3:
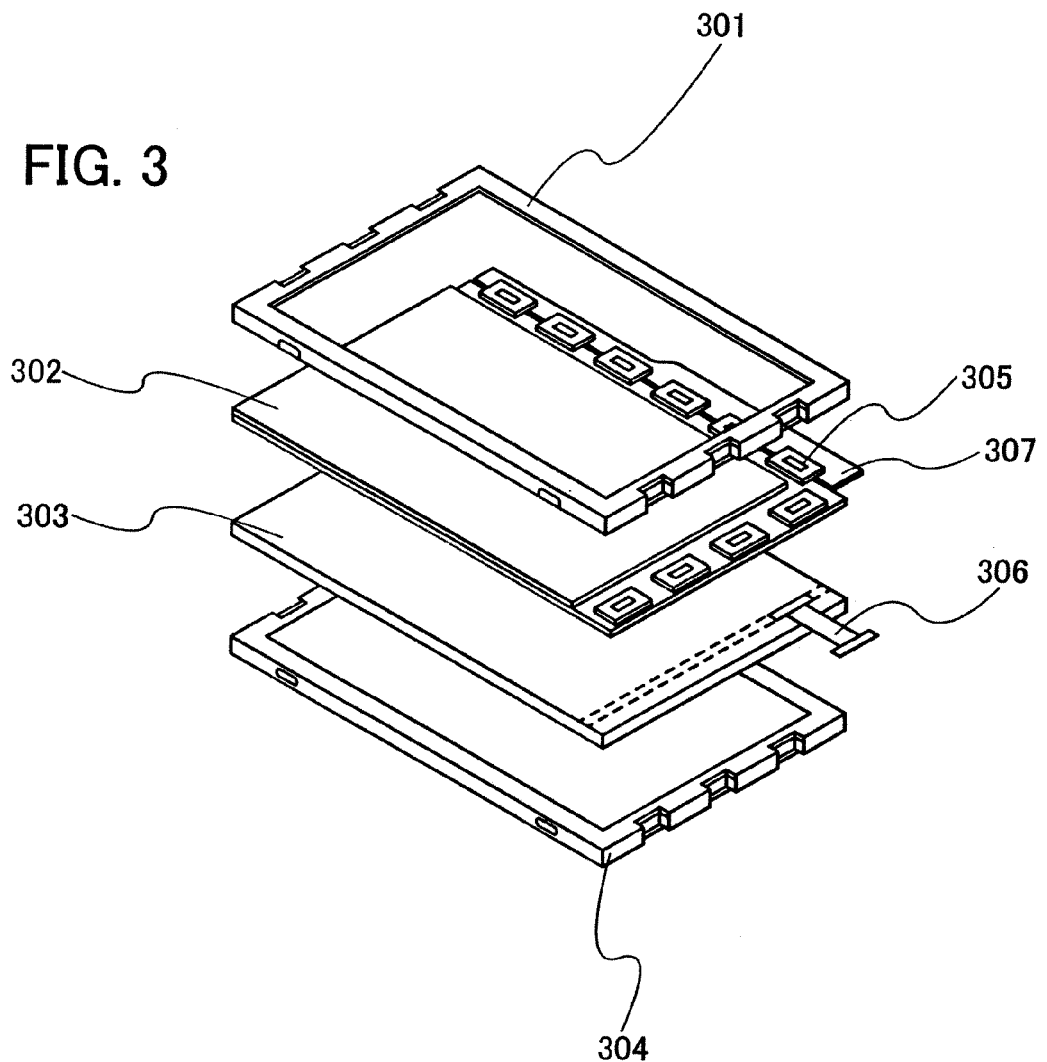
FIG. 3 is a view showing an exploded perspective view of a liquid crystal module (Embodiment 1).

In this embodiment, an example in which the liquid crystal panel that is obtained in Embodiment Mode 1 or Embodiment Mode 2 is a liquid crystal module is shown in FIG. 3.

FIG. 3 is an explored perspective view of the liquid crystal module in which an LED (light emitting diode) is used as backlight. In a liquid crystal panel 302 obtained in Embodiment Mode 1 or Embodiment Mode 2, a plurality of driving ICs 305 are provided over an element substrate, and an FPC 307 that is electrically connected to a terminal provided over the element substrate is also provided.

A backlight 303 is arranged under the liquid crystal panel 302. In the backlight 303, a plurality of LEDs are used, and current is supplied from a connection code 306. As a light emitting material of the LED, an inorganic material or an organic material may be used.

It is to be noted that one kind of an LED that emits white light may be used, or three kinds of LEDs each of which emit red, blue, and green light may be used.

The use of an LED as a backlight of a liquid crystal panel can provide a backlight in which consumption power is reduced. In addition, since the LED is a surface emission lighting system and the area thereof can be increased, an area of the backlight can be increased and an area of a display surface can also be increased. Further, since the LED is thin and consumes less power, the thickness and power consumption of the display device can also be reduced.

A first chassis 301 and a second chassis 304 are arranged so as to sandwich the liquid crystal panel 302 and the backlight 303, and peripheral portions of each chassis are bonded. Here, a window of the first chassis 301 is to be a display surface of the liquid crystal module.

The liquid crystal module has a simple structure in which only one polarizing element having dichroism is arranged between the substrate of the liquid crystal panel 302 on the backlight side and the backlight 303.

Alternatively, LEDs may be arranged in a linear shape in a portion that does not overlap the display surface, and light may be supplied to the liquid crystal panel with the use of a light conducting plate. In that case, it is preferable that light be reflected in a region that overlaps with the display surface of the second chassis 304.

In this embodiment, an example of the liquid crystal module using the backlight that uses the LEDs as a light source is shown; however, the liquid crystal module is not particularly limited, and a liquid crystal module using a light conducting plate and a backlight that uses a cathode cold tube or the like as a light source may be employed.

This embodiment can be freely combined with Embodiment Mode 1 or Embodiment Mode 2.

[Embodiment 2]

Examples of liquid crystal display devices and electronic devices of the present invention are as follows: cameras such as video cameras or digital cameras, goggle type displays (head mounted display), navigation systems, sound reproduction devices (a car audio, an audio component, or the like), notebook personal computers, game machines, mobile information terminals (a mobile computer, a mobile telephone, a mobile game machine, an electronic book device, or the like), image reproduction devices equipped with a recording medium (specifically, a device that reproduces the recording medium such as a digital versatile disc (DVD) and that is equipped with a display for displaying the image), and the like. Specific examples of those electronic devices are shown in FIGS. 4A to 4D and FIG. 5.

Figure 4A:
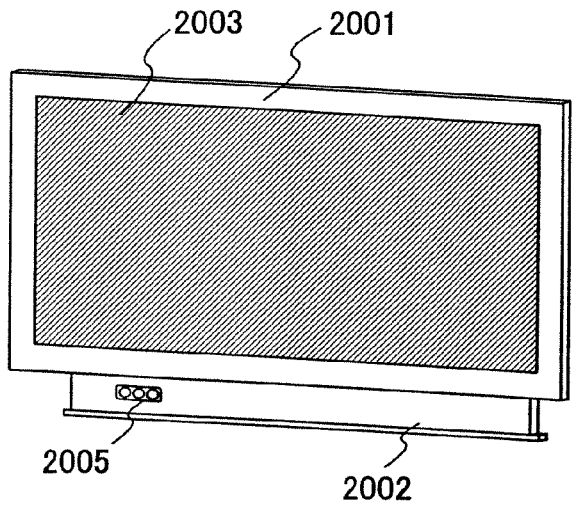
FIGS. 4A to 4D are views each showing an example of an electronic device (Embodiment 2).

FIG. 4A shows a large-sized display device having a 22-inch to 50-inch large screen, which includes a chassis 2001, a support 2002, a display portion 2003, a video input terminal 2005, and the like. The display portion 2003 corresponds to the liquid crystal module of Embodiment 1. It is to be noted that the display device includes all display devices for displaying information such as for a personal computer, TV broadcast reception, and interactive TV. The present invention can achieve a large-sized display device having a wide viewing angle and high contrast even when using a glass substrate of or after the fifth generation having a side of more than 1000 mm.

Figure 4B:
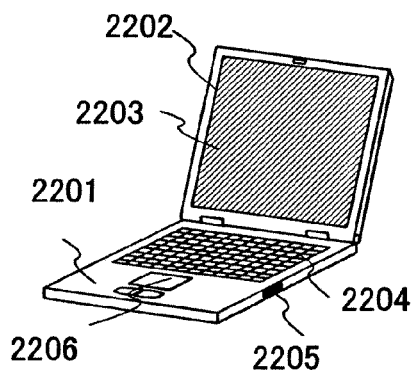

FIG. 4B shows a notebook personal computer, which includes a main body 2201, a chassis 2202, a display portion 2203, a keyboard 2204, an external connection port 2205, a pointing device 2206, and the like. The present invention can achieve a notebook personal computer in which display with high contrast can be performed even under external light in daytime.

Figure 4C:
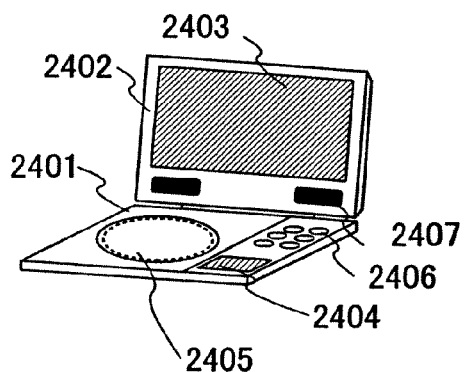

FIG. 4C shows a mobile image reproduction device equipped with a recording medium (specifically, a DVD reproduction device), which includes a main body 2401, a chassis 2402, a display portion A 2403, a display portion B 2404, a recording medium (DVD or the like) reading portion 2405, an operation key 2406, a speaker portion 2407, and the like. The display portion A 2403 mainly displays image information, and the display portion B 2404 mainly displays character information. It is to be noted that the image reproduction device equipped with a recording medium includes a home-use game machine and the like. The present invention can achieve an image reproduction device in which display with high contrast can be performed even under external light in daytime.

Figure 4D:
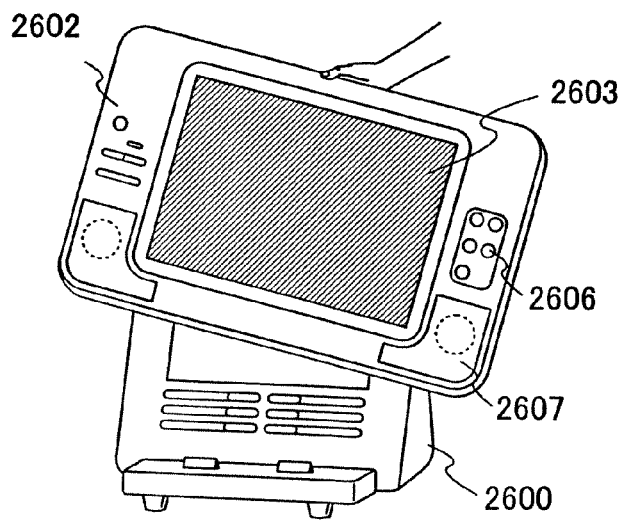

FIG. 4D shows a TV, only a display of which can be carried wirelessly. A chassis 2602 incorporates a battery and a signal receiver, and a display portion 2603 and a speaker portion 2607 are driven by the battery. The battery can be charged repeatedly by using a battery charger 2600. The battery charger 2600 can send and receive video signals, which can be sent to the signal receiver of the display. The chassis 2602 is controlled by an operation key 2606. Since the device shown in FIG. 4D can transmit signals from the chassis 2602 to the battery charger 2600 by operating the operation key 2606, it can also be referred to as a video and audio interactive communication device. In addition, since the device can send signals from the chassis 2602 to the battery charger 2600 by operating the operation key 2606 and can control communication of another electronic device by causing the electronic device to receive signals sent from the battery charger 2600, it can also be referred to as a general-purpose remote control device. The present invention can provide a relatively large-sized (22-inch to 50-inch) mobile TV that can be carried outdoors and, accordingly users can enjoy display with high contrast even under external light in daytime.

Figure 5:
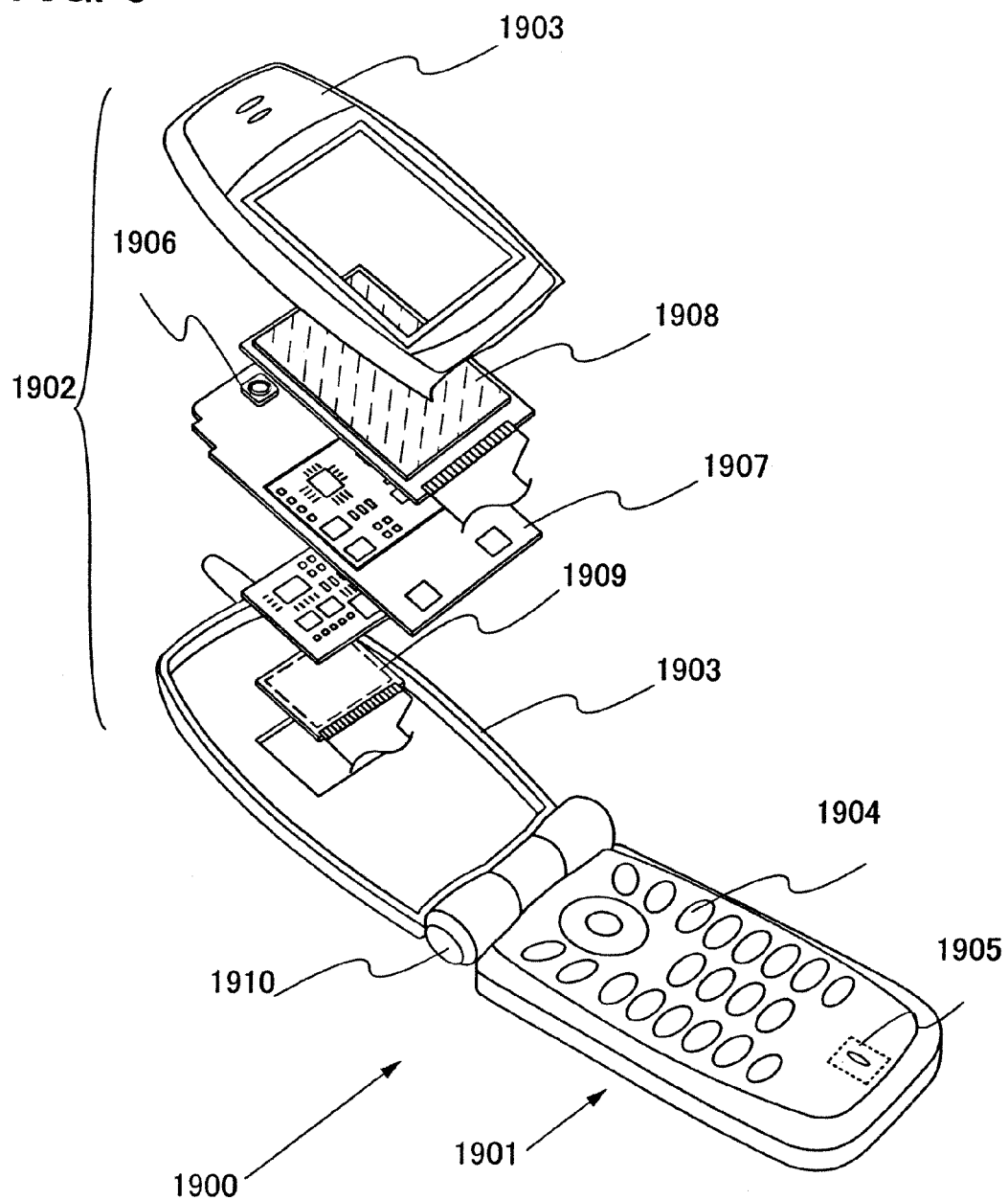
FIG. 5 is an exploded perspective view of an example of an electronic device (Embodiment 2).

In a mobile phone shown in FIG. 5, a main body (A) 1901 including operation switches 1904, a microphone 1905, and the like is connected to a main body (B) 1902 including a display panel (A) 1908, a display panel (B) 1909, a speaker 1906, and the like by a hinge 1910 so as to be able to open and close. The display panel (A) 1908 and the display panel (B) 1909 are stored in a chassis 1903 of the main body (B) 1902 together with a circuit board 1907. Pixel portions of the display panel (A) 1908 and the display panel (B) 1909 are arranged so as to be visible through open windows formed in the chassis 1903.

As for the display panel (A) 1908 and the display panel (B) 1909, specifications such as the number of pixels can be appropriately set in accordance with functions of the mobile phone 1900. For example, the display panel (A) 1908 and the display panel (B) 1909 can be combined as a main screen and a sub-screen, respectively.

The mobile phone of this embodiment can be modified in various modes depending on functions or applications thereof. For example, it may be a camera-equipped mobile phone by incorporating an imaging element in the hinge 1910. In addition, the operation switches 1904, the display panel (A) 1908, and the display panel (B) 1909 may be stored in one chassis. The present invention can provide a mobile phone in which, in a case of using the mobile phone in the outdoors, display with high contrast can be made on the display panel (A) 1908 and the display panel (B) 1909 even under external light in daytime.

As described above, the liquid crystal display device obtained by implementation of the present invention may be used as display portions of various electronic devices.

Such a liquid crystal display device may be mounted on a window of vehicles (such as an automobile and a train) or placed at a window of stores.

Figure 6A:
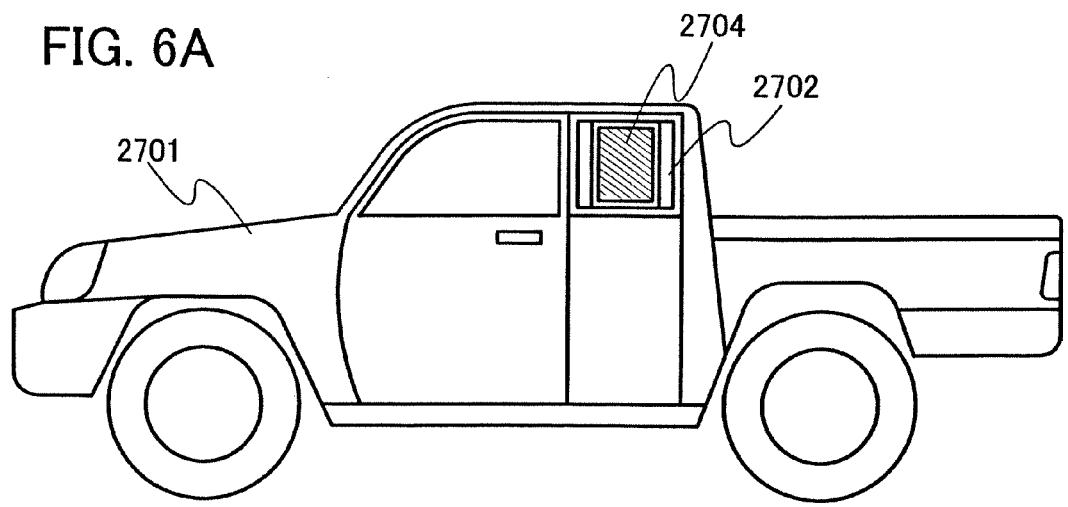
FIGS. 6A and 6B are respectively a side view of a vehicle on which an electronic device is mounted and a rear view of the vehicle seen from a backside (Embodiment 2).
Figure 6B:
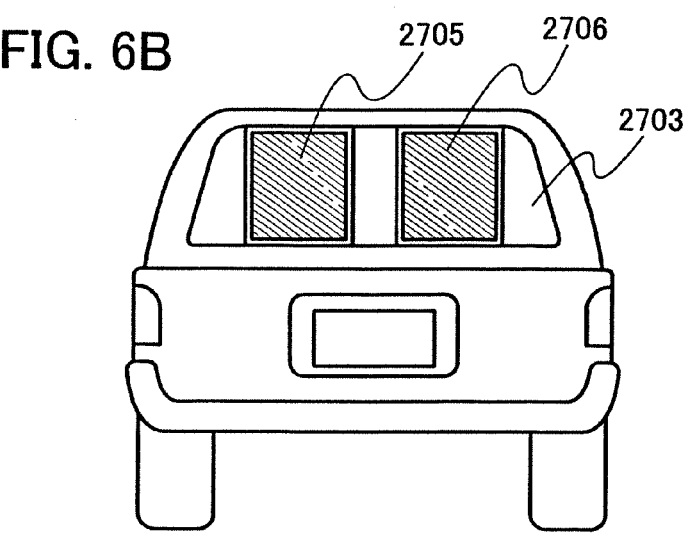

FIGS. 6A and 6B show an example in which a liquid crystal display device is mounted on a vehicle, specifically, an automobile. This liquid crystal display device is not one to be mainly seen by a person in a car on which the liquid crystal display device is mounted, but one to be seen by pedestrians or persons in other cars in the vicinity so that the car on which the liquid crystal display device is mounted is noticeable. Accordingly, a first liquid crystal display device 2704 as shown in FIG. 6A, a second liquid crystal display device 2705 and a third liquid crystal display device 2706 as shown in FIG. 6A are provided so that each display surface thereof is directed outside of the vehicle 2701. The liquid crystal display devices are mainly provided for a side window 2702 and a rear window 2703 so as not to narrow a filed of view of a driver. When the liquid crystal display device is provided for a window that is not opened and closed, the liquid crystal display device can be fixed to the window. In this embodiment, the second liquid crystal display device 2705 and the third liquid crystal display device 2706 are fixed to the rear window 2703.

In a case where the liquid crystal display device is used as accessory, it is desired that the liquid crystal display device have a wide viewing angle and be capable of displaying a vivid color image. Also, high contrast under external light in daytime is desirable. Further, it is desirable to avoid a following situation: the second liquid crystal display device 2705 and the third liquid crystal display device 2706 reflect sunlight in daytime or lighting of the car in nighttime; and reflected light gets into eyes of the driver in the car in the vicinity, because it is an obstacle to driving.

Since the liquid crystal display device of the present invention can have a wide viewing angle and perform high image display with high contrast, and particularly realize high contrast under external light, it is suitable to set the liquid crystal display device at a window of vehicles (such as an automobile and a train) and a window of stores. The liquid crystal display device of the present invention can provide a screen that is easy on human-eyes, since the screen has no dazzle by suppressing reflected glare of external light.

Further, the second liquid crystal display device 2705 and the third liquid crystal display device 2706 display an image for advertisement through the rear window 2703, whereby advertisement can be performed.

This embodiment can be freely combined with any one of Embodiment Mode 1, Embodiment Mode 2, and Embodiment 1.

In accordance with the present invention, a screen that that is easy on human-eyes, which has no dazzle by suppressing reflected glare of external light can be provided.

This application is based on Japanese Patent Application Ser. No. 2006-154801 filed in Japan Patent Office on Jun. 2, 2006, the entire contents of which are hereby incorporated by reference.

What is claimed is:

1. A semiconductor device comprising:
a pair of a first substrate and a second substrate;
a liquid crystal layer between the first substrate and the second substrate;
a plurality of colored layers between the first substrate and the liquid crystal layer;
a first polarizing element between the colored layers and the liquid crystal layer;
a transistor between the second substrate and the liquid crystal layer;
a first insulating layer over the transistor;
a pixel electrode and a common electrode over the first insulating layer;
a second insulating layer between the pixel electrode and the common electrode;
a second polarizing element; and
a backlight arranged under the second polarizing element;
wherein at least one of the pixel electrode and the common electrode comprises a transparent conductive film,
wherein the pixel electrode is closer to the liquid crystal layer than the common electrode,
wherein a thickness of the first insulating layer is larger than a thickness of the second insulating layer,
wherein a channel formation region of the transistor comprises a portion not overlapping with the common electrode, and
wherein the channel formation region of the transistor comprises a portion overlapping with the first polarizing element.

2. A semiconductor device according to claim 1, further comprising a first alignment film between the pixel electrode and the liquid crystal layer.

3. A semiconductor device according to claim 1, further comprising a second alignment film between the first polarizing element and the liquid crystal layer.

4. A semiconductor device according to claim 1, further comprising a light shielding layer among the colored layers that are different from each other.

5. A semiconductor device according to claim 1, further comprising a columnar spacer between the second substrate and the liquid crystal layer.

6. A semiconductor device according to claim 1, further comprising a light interference layer.

7. A semiconductor device according to claim 1, wherein at least one of the first polarizing element and the second polarizing element has dichroism.

8. A semiconductor device according to claim 1, wherein the second polarizing element is located on an outer surface of the second substrate.

9. A semiconductor device according to claim 1, wherein at least one of the pixel electrode and the common electrode has a comb-like electrode shape or a bent electrode shape.

10. A semiconductor device according to claim 1, wherein the backlight comprises an LED.

11. A semiconductor device comprising:
a pair of a first substrate and a second substrate;
a liquid crystal layer between the first substrate and the second substrate;
a plurality of colored layers between the first substrate and the liquid crystal layer;
a first polarizing element between the colored layers and the liquid crystal layer;
an overcoat layer between the colored layers and the first polarizing element;
a transistor between the second substrate and the liquid crystal layer;
a first insulating layer over the transistor;
a pixel electrode and a common electrode over the first insulating layer;
a second insulating layer between the pixel electrode and the common electrode;
a second polarizing element; and
a backlight arranged under the second polarizing element;

wherein at least one of the pixel electrode and the common electrode comprises a transparent conductive film, wherein the pixel electrode is closer to the liquid crystal layer than the common electrode, wherein a thickness of the first insulating layer is larger than a thickness of the second insulating layer, wherein a channel formation region of the transistor comprises a portion not overlapping with the common electrode, and wherein the channel formation region of the transistor comprises a portion overlapping with the first polarizing element.

12. A semiconductor device according to claim 11, further comprising a light interference layer.

13. A semiconductor device according to claim 11, further comprising a first alignment film between the pixel electrode and the liquid crystal layer.

14. A semiconductor device according to claim 11, further comprising a second alignment film between the first polarizing element and the liquid crystal layer.

15. A semiconductor device according to claim 11, further comprising a light shielding layer among the colored layers that are different from each other.

16. A semiconductor device according to claim 11, further comprising a columnar spacer between the second substrate and the liquid crystal layer.

17. A semiconductor device according to claim 11, wherein at least one of the first polarizing element and the second polarizing element has dichroism.

18. A semiconductor device according to claim 11, wherein the second polarizing element is located on an outer surface of the second substrate.

19. A semiconductor device according to claim 11, wherein at least one of the pixel electrode and the common electrode has a comb-like electrode shape or a bent electrode shape.

20. A semiconductor device according to claim 11, wherein the backlight comprises an LED.

21. A semiconductor device comprising:
a pair of a first substrate and a second substrate;
a liquid crystal layer between the first substrate and the second substrate;
a plurality of colored layers between the first substrate and the liquid crystal layer;
a first polarizing element between the colored layers and the liquid crystal layer;
a transistor between the second substrate and the liquid crystal layer;
a first insulating layer over the transistor;
a pixel electrode and a common electrode over the first insulating layer;
a second insulating layer between the pixel electrode and the common electrode;
a second polarizing element; and
a backlight arranged under the second polarizing element;
wherein at least one of the pixel electrode and the common electrode comprises a transparent conductive film, wherein a thickness of the first insulating layer is lager than a thickness of the second insulating layer, wherein a channel formation region of the transistor comprises a portion not overlapping with the common electrode, and wherein the channel formation region of the transistor comprises a portion overlapping with the first polarizing element.

22. A semiconductor device according to claim 21, further comprising a first alignment film between the pixel electrode and the liquid crystal layer.

23. A semiconductor device according to claim 21, further comprising a second alignment film between the first polarizing element and the liquid crystal layer.

24. A semiconductor device according to claim 21, further comprising a light shielding layer among the colored layers that are different from each other.

25. A semiconductor device according to claim 21, further comprising a columnar spacer between the second substrate and the liquid crystal layer.

26. A semiconductor device according to claim 21, further comprising a light interference layer.

27. A semiconductor device according to claim 21, wherein at least one of the first polarizing element and the second polarizing element has dichroism.

28. A semiconductor device according to claim 21, wherein the second polarizing element is located on an outer surface of the second substrate.

29. A semiconductor device according to claim 21, wherein at least one of the pixel electrode and the common electrode has a comb-like electrode shape or a bent electrode shape.

30. A semiconductor device according to claim 21, further comprising an overcoat layer between the colored layers and the first polarizing element.

31. A semiconductor device according to claim 21, wherein the backlight comprises an LED.

* * * * *